United States Patent
Misewich et al.

(10) Patent No.: US 7,002,646 B2
(45) Date of Patent: Feb. 21, 2006

(54) TUNABLE THIN FILM OPTICAL DEVICES AND FABRICATION METHODS FOR TUNABLE THIN FILM OPTICAL DEVICES

(75) Inventors: James A. Misewich, Peekskill, NY (US); Alejandro Gabriel Schrott, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 10/388,538

(22) Filed: Mar. 17, 2003

(65) Prior Publication Data

US 2004/0183964 A1 Sep. 23, 2004

(51) Int. Cl.
- *G02F 1/1347* (2006.01)
- *G02F 1/1333* (2006.01)
- *G02F 1/1335* (2006.01)
- *G02F 1/13* (2006.01)

(52) U.S. Cl. .......................... 349/74; 349/84; 349/113; 349/198

(58) Field of Classification Search ................. 349/74, 349/84, 113, 198, 73
See application file for complete search history.

(56) References Cited

U.S. PATENT DOCUMENTS

| | | | | |
|---|---|---|---|---|
| 4,040,720 A | * | 8/1977 | York ............................ 349/84 |
| 4,257,016 A | * | 3/1981 | Kramer et al. ............... 359/305 |
| 4,779,959 A | * | 10/1988 | Saunders .................... 349/198 |
| 4,790,634 A | * | 12/1988 | Miller et al. ................ 349/198 |
| 5,150,236 A | * | 9/1992 | Patel .......................... 349/198 |
| 5,202,600 A | * | 4/1993 | Fujita et al. ................ 310/338 |
| 5,493,426 A | * | 2/1996 | Johnson et al. ............... 349/74 |
| 5,990,990 A | * | 11/1999 | Crabtree ....................... 349/74 |
| 6,271,899 B1 | * | 8/2001 | Lewis et al. .................. 349/86 |
| 6,791,644 B1 | * | 9/2004 | Toda ........................... 349/114 |
| 6,798,553 B1 | * | 9/2004 | Scobey et al. ............... 359/260 |
| 2002/0141031 A1 | * | 10/2002 | Wang et al. ................. 359/260 |
| 2003/0020865 A1 | * | 1/2003 | Hoke ........................... 349/198 |
| 2003/0081319 A1 | * | 5/2003 | Hsu ............................. 359/579 |

FOREIGN PATENT DOCUMENTS

| | | | |
|---|---|---|---|
| JP | 63-75727 | * | 4/1988 |
| JP | 2000-258755 | * | 9/2000 |

OTHER PUBLICATIONS

Wang, et al., "Thin Ferroelectric Interferometer for Spatial Light Modulations", Applied Optics, vol. 37, No. 32, Nov. 10, 1998, pp. 7490-7495.

* cited by examiner

*Primary Examiner*—Tarifur R. Chowdhury
(74) *Attorney, Agent, or Firm*—Richard M. Ludwin, Esq.; McGinn IP Law Group, PLLC

(57) ABSTRACT

Thin film structures include electro-optic materials and transparent conducting materials which are combined to fabricate vertical optical devices. The electro-optic materials are responsive to an electric field to change an optical characteristic. For example, a modulator can be fabricated by making a dielectric mirror from such materials by alternating the electro-optic material with the transparent conducting material. The mirror reflection band can then be tuned by applying an electric field between the transparent conducting layers.

14 Claims, 14 Drawing Sheets

ELECTRO-OPTIC EFFECT = 1.03
F.E. EXPANSION = 1
F = 360
$R_{metal}$ = 0.9
$l_{film}$ = 200
$n_{film}$ = 2.3

TUNABLE THIN FILM OPTICAL DEVICES AND FABRICATION METHODS FOR TUNABLE THIN FILM OPTICAL DEVICES

BACKGROUND OF THE INVENTION

1. Field of the Invention

The present invention generally relates to thin film optical coating technologies. In particular, the present invention relates to electrically tunable thin film optical devices where the light propagates in a direction perpendicular to the plane of the thin film and fabrication methods therefor.

2. Description of the Related Art

Thin film optical coating technology is used in a wide variety of optical applications such as antireflection coatings, mirrors and filters. These coatings are static in that the thickness and index of refraction are determined at the time of manufacture. Therefore, the optical properties are fixed at the time of manufacture.

The electro-optic effect of the modulation of the index of refraction of a material upon application of an electric field is well known. Another contribution to the optical path associated with application of an electric field to a thin film is the piezoelectric, or electro-striction, effect in which the length of the material changes upon application of an electric field. These wave propagation in electro-optic and piezoelectric material effects are summarized in equations (1)–(5) shown below:

$$\vec{E} = \vec{E}_0 e^{-i(\omega t - \vec{k} \cdot \vec{z})} \quad (1)$$

$$|\vec{k}| = \frac{2\pi}{\lambda_0} n \quad (2)$$

$$\frac{\Delta \phi}{\pi} = \frac{2}{\lambda_0} [n \Delta z + z \Delta n] \quad (3)$$

$$\Delta z / z = d_{eff} E_{appl} \quad (4)$$

$$\Delta n / n = \frac{n^2}{2} r_{eff} E_{appl} \quad (5)$$

where Equation (4) is for the piezoelectric effect and Equation (5) is for the electro-optic effect.

Upon application of an electric field, $E_{appl}$, the total optical phase change, $\Delta\theta$ is dependent on the electro-optic effect and the piezoelectric effect. The equations shown above determine the phase change as a function of the applied electric field.

FIG. 1 shows a structure 100 in which an electro-optic (and/or piezoelectric) material can be made to modulate light. The structure of FIG. 1 is transverse and in the plane of the thin film. The structure is transverse in that the electric field is applied transverse to the direction of propagation, which is in the plane of the sample as indicated by the optical wave vector, k, as is commonly used in electro-optic applications today.

Because the light propagates in the plane of the thin film, light must be coupled into and out of this plane, which can be inconvenient. Also, the number of devices which can be made, per wafer of thin film material, is small. Finally, since the light is propagating in the plane of the thin film, it is difficult to add more thin film optical elements, such as mirrors and other electro-optic layers to manufacture more complex integrated optical devices.

SUMMARY OF THE INVENTION

In view of the foregoing and other problems, drawbacks, and disadvantages of the conventional methods and structures, a purpose of the present invention is to provide a method and structure in which piezo-electric and electro-optic materials are used in conjunction with at least one transparent conducting electrode to make a thin film coating whose thickness and index of refraction can be changed for propagation of light normal to the thin film by application of an electric field.

With the use of transparent conducting electrodes, the electrodes can also be deposited by thin film techniques to make electro-optic elements in which the direction of propagation of the light is normal to the plane of the thin films and the light passes through the electrodes which apply the electric field. Such a device is a longitudinal modulator since the direction of propagation and the direction of the applied electric field are parallel. In this manner, more complicated integrated optical devices can be fabricated by stacking appropriate thin films of electro-optic materials, transparent conducting electrodes, and optical materials.

In a first aspect of the present invention, an electro-optical device includes a first conducting material layer, an electro-optic material layer on the conducting material layer, and a second conducting material layer on the electro-optic material layer. The electro-optical material layer is responsive to an electric field to change an optical characteristic.

In a second aspect of the present invention, a method for producing an electro-optical device includes forming a first conducting material layer on a transparent substrate, forming an electro-optic material layer on the conducting material layer, and forming a second conducting material layer on the electro-optic material layer. The electro-optical material layer is responsive to an electric field to change an optical characteristic.

In a third aspect of the present invention, an electro-optical device includes a plurality of conducting material layers and a plurality of electro-optic material layers distributed between the plurality of conducting material layers. Each of the plurality of electro-optical material layers is responsive to an electric field to change an optical characteristic.

In a fourth aspect of the present invention, an electro-optical device includes a plurality of electro-optic material layers which may have different electro-optic coefficients, a plurality of static optical property layers and a set of electrodes separating the plurality of electro-optic material layers. The electro-optical material layers is responsive to an electric field between the electrodes to change an optical characteristic.

The invention has tremendous advantages over static thin film coatings in that entirely new applications for the technology may be used and developed. Since the thin film conductors, the thin film piezoelectric, and the thin film electro-optic materials can all be processed using lithographic techniques, a wide variety of integrated optical components with electrically tunable optical properties can be manufactured. For example, an array or matrix of tunable optical mirrors can be integrated on a transparent substrate. This may have advantageous applications in optical communications and optical displays.

Using thin film longitudinal optical devices in a vertical arrangement means that lithographic techniques can be used to make 2-dimensional arrays of these devices. By making the devices small, they are not only dense (and, therefore, inexpensive) but also fast. The high speed of small devices comes about because the inherent speed of the vertical device is limited by the capacitance of the structure. The capacitance will diminish as the area of the device decreases.

BRIEF DESCRIPTION OF THE DRAWINGS

The foregoing and other purposes, aspects and advantages will be better understood from the following detailed description of exemplary embodiments of the invention with reference to the drawings, in which.

DETAILED DESCRIPTION OF EXEMPLARY EMBODIMENTS OF THE INVENTION

Figure 2:
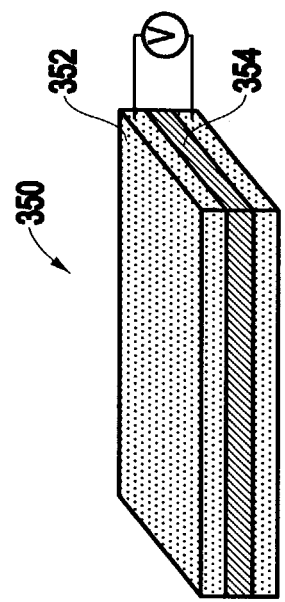
FIG. 2 shows a perspective view of a longitudinal electro-optic structure 200 in accordance with an exemplary embodiment of the invention.

Referring now to the drawings, and more particularly to FIGS. 2–18, there are shown exemplary embodiments of the methods and structures according to the present invention.

As shown in FIG. 2, an electric field is applied in the vertical direction to the electro-optic structure 200. The vertical direction is the direction of the optical wave vector k in this case. The challenge of the vertical, or longitudinal, structure is that the calculated optical phase shifts are very small. This is illustrated in equations (6)–(7) shown below where the half-wave voltage, which is the voltage needed to induce an optical phase shift of p radians, is calculated for the longitudinal structure 200 of FIG. 2 using these equations. In this calculation, for clarity, only the electro-optic effect is used, whereas the piezoelectric effect is neglected. The formula could easily be generalized to include both effects, but many electro-optic materials are in fact not piezoelectric.

$$\frac{\Delta\phi}{\pi} = \frac{2}{\lambda_0}z\Delta n = \frac{1}{\lambda_0}zn^3 r_{\mathit{eff}} E_{appl} = \frac{1}{\lambda_0}zn^3 r_{\mathit{eff}} \frac{V_{appl}}{l} \qquad (6)$$

$$\frac{\Delta\phi}{\pi} = 1 \Rightarrow V_\pi = \frac{\lambda}{2n^3 r_{\mathit{eff}}}\frac{z}{l} \qquad (7)$$

where z is the geometrical path that the optical beam follows in the electro-optic material and l is the distance between electrodes.

In the case of a transverse structure 100, the optical path can be very long while the distance between the electrodes is kept small. However, in the longitudinal case, the length of the electro-optic material through which the beam travels is equal to the spacing between the electrodes. The result is that the longitudinal structure 200 has a much higher half-wave voltage. For example, for the longitudinal case when z/l=1 then Vπ=180 volts and for the transverse case when z/l=1000 then Vπ=0.18 volts. This longitudinal voltage is unreasonably high and is one reason why the longitudinal structure 200 has not been extensively explored.

Indeed, by applying a reasonable field, of about 300 kV/cm, and using published values for both the electro-optic and piezoelectric coefficients (of Δz/z=0.005 and Δn/n=0.0347) in the strongly electro-optic and piezoelectric material, PZT (lead lanthanum zirconate), the calculated phase shift Δθ/π using equation (8) below is quite small (0.068).

$$\frac{\Delta\phi}{\pi} = \frac{2}{\lambda_0}[n\Delta z + z\Delta n] \qquad (8)$$

Thus, the electro-optic materials, by themselves, are not a practical method of modulating light in a vertical or thin longitudinal structure.

Figure 3B:
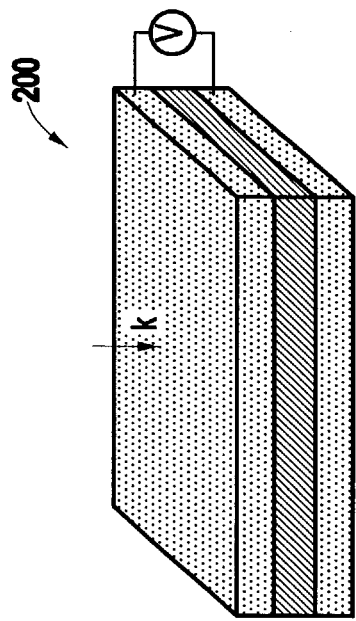
FIG. 3B shows a perspective view of an etalon structure 350 in accordance with an exemplary embodiment of the invention.
Figure 1:
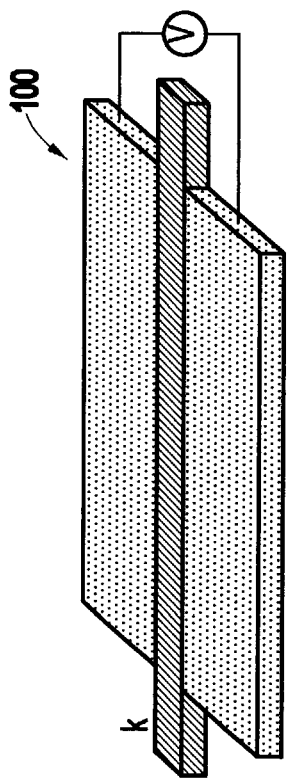
FIG. 1 shows a perspective view of a conventional transverse electro-optic structure 100.
Figure 3A:
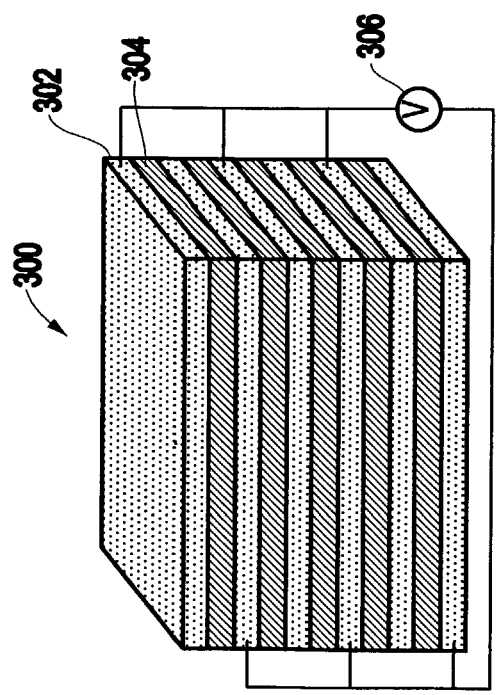
FIG. 3A shows a perspective view of a multiple layer structure 300 in accordance with an exemplary embodiment of the invention.

The inventors have observed that the modest optical phase shifts provided by these thin films can be used to make significant modulation of optical power if interference effects are used. Two methods of using interference to magnify the results are illustrated in FIGS. 3A and 3B. The structure 300 shown in FIG. 3A is a multilayer structure of alternating layers of transparent conducting material 302 and electro-optic (and/or piezoelectric) material 304. By applying a field to the electro-optic layers 304 by, for example as illustrated, connecting alternate transparent conducting layers 302 to opposite poles of a power supply 306, the index of the electro-optic layers can be modulated. A periodic structure in which the index is varied will have interesting optical features due to reflection at each interface and the corresponding interference.

The structure 350 shown in FIG. 3B shows another method of making a vertical modulator by using relatively highly reflecting top 352 and bottom electrodes 354. Then, an etalon structure 350 is attained. The results for each of these structures are examined below.

The optical properties of a static multilayer structure 300 are calculated using the matrix techniques illustrated by equations (9)–(12) shown below. These equations solve Maxwell's equations using total fields including all reflections in boundary conditions.

$$\begin{bmatrix} E_1 \\ H_1 \end{bmatrix} = \begin{bmatrix} \cos(k_0 n_1 z \cos\theta_1) & -\frac{i}{p}\sin(k_0 n_1 z \cos\theta_1) \\ \frac{i}{p}\sin(k_0 n_1 z \cos\theta_1) & \cos(k_0 n_1 z \cos\theta_1) \end{bmatrix} \begin{bmatrix} E_2 \\ H_2 \end{bmatrix} \quad (9)$$

$$= M \begin{bmatrix} E_2 \\ H_2 \end{bmatrix}$$

$$\begin{bmatrix} E_1 \\ H_1 \end{bmatrix} = M_1 M_2 M_3 \ldots M_n \begin{bmatrix} E_2 \\ H_2 \end{bmatrix} \quad (10)$$

$$= M \begin{bmatrix} E_2 \\ H_2 \end{bmatrix}$$

$$= \begin{bmatrix} A & B \\ C & D \end{bmatrix} \begin{bmatrix} E_2 \\ H_2 \end{bmatrix}$$

$$r = \frac{An_0 + Bn_s n_0 - C - Dn_s}{An_0 + Bn_s n_0 + C + Dn_s} \quad (11)$$

$$t = \frac{2n_0}{An_0 + Bn_s n_0 + C + Dn_s} \quad (12)$$

where:

$$S\text{-polarized}(TE) \equiv p = n_1 \cos\theta_1 \quad (13)$$

$$P\text{-polarized}(TM) \equiv p = \cos\theta_1 / n_1 \quad (14)$$

The difference in the present case is that the index of refraction of the electro-optic layers is not constant, but rather is dependent on the electric field as described above. Thus, a static calculation is done for each electric field value after using the electro-optic effect to determine the resulting indices of refraction.

Figure 4:
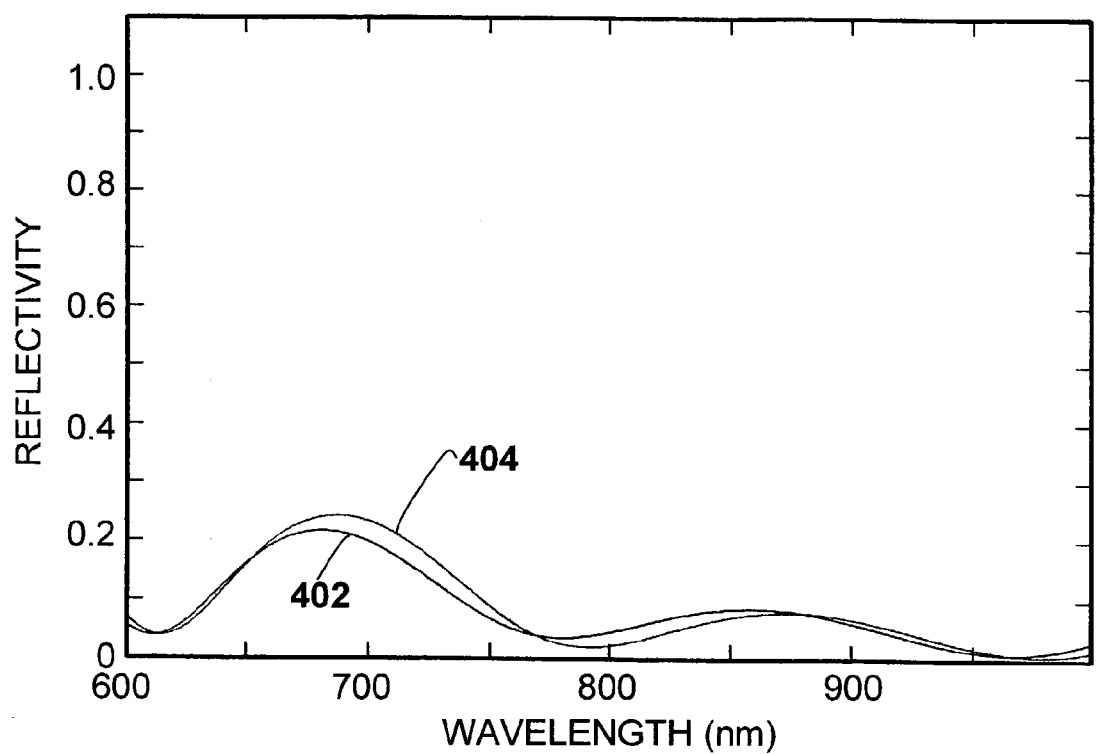
FIG. 4 shows a graph of reflectivity for one period for one electro-optic material layer in accordance with an exemplary embodiment of the invention.
Figure 5:
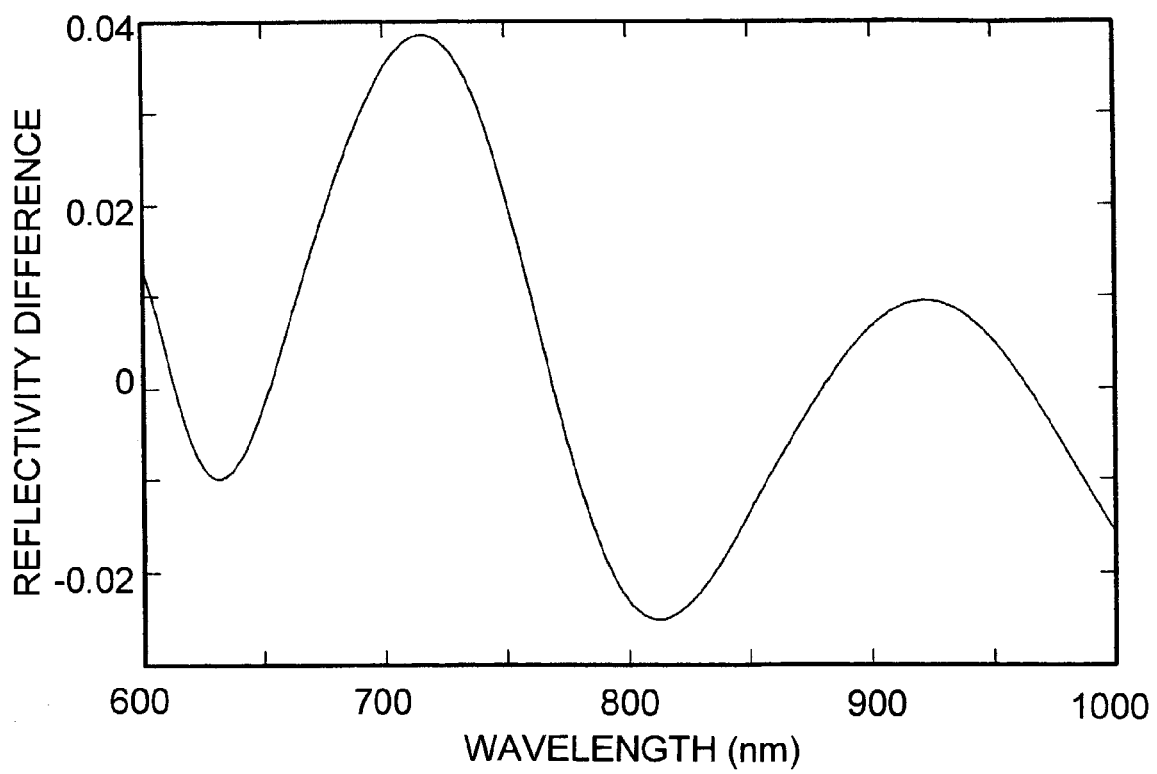
FIG. 5 shows a graph of a reflectivity difference from FIG. 4.

Using this technique, the inventors calculated the performance of a multilayer stack including a transparent conducting material having an index of refraction 1.5 and a thickness of 400 nm and an electro-optic material having a thickness of 400 nm with a zero field index of refraction of 2.3 and having an electro-optic coefficient such that the applied voltage can change the index of refraction by three percent (this electro-optic effect is roughly appropriate for PZT). FIG. 4 shows the reflectivity for one period of such a structure. Here a period refers to one transparent conducting layer and one electro-optic material layer. All structures, no matter how many periods, are terminated with another transparent conducting layer. The first line 402 represents the reflectivity of the structure with 0 volts applied to the electro-optic layers while the second line 404 represents the reflectivity of the structure with a voltage which induces a 3 percent index of refraction change. The reflectivity difference between these two curves is shown in FIG. 5. Only a small modulation of the reflectivity is seen in this structure with only one period as expected from the explanation provided above about the small electro-optic phase change associated with the thin layer.

Figure 6:
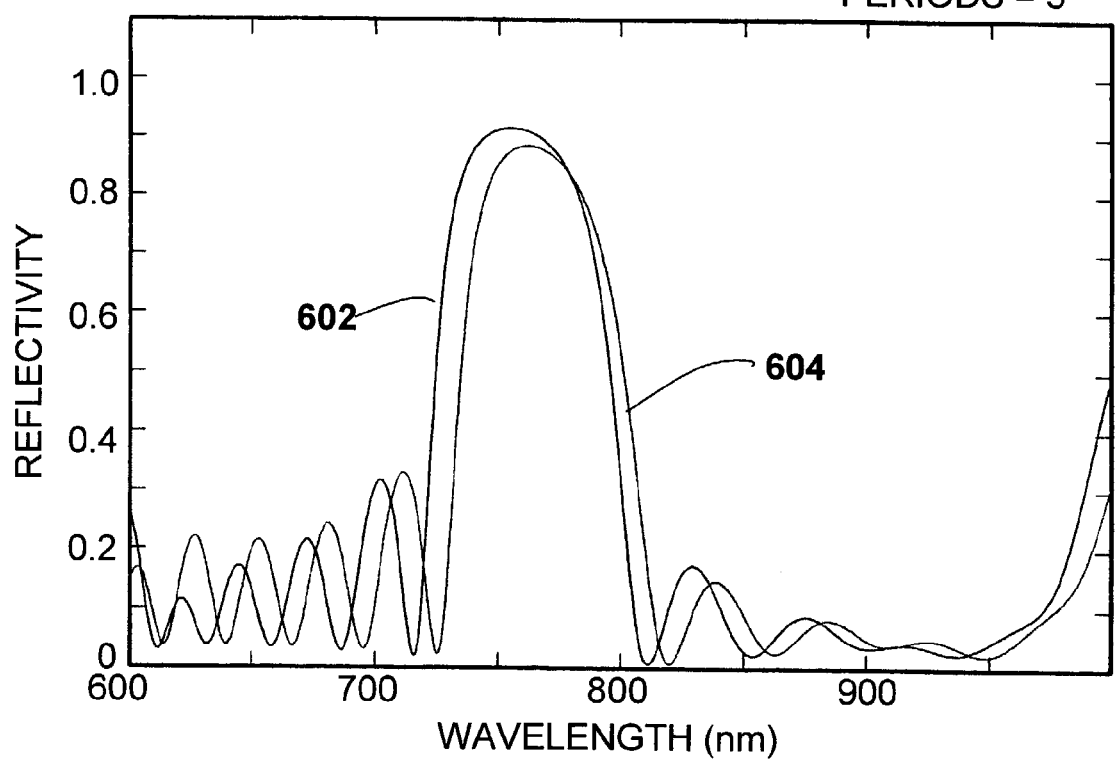
FIG. 6 shows a graph of the reflectivity for a structure with five periods of materials in accordance with an exemplary embodiment of the invention.

However, the multiple interference associated with a multilayer structure can lead to significant results. FIG. 6 shows the reflectivity for a structure with five periods of materials with index of refraction and electro-optic properties described above. Again, the first line 602 represents the reflectivity of the structure with zero volts applied to the electro-optic layers while the second line 604 represents the reflectivity of the structure with a voltage which induces a three percent index of refraction change applied.

Figure 7:
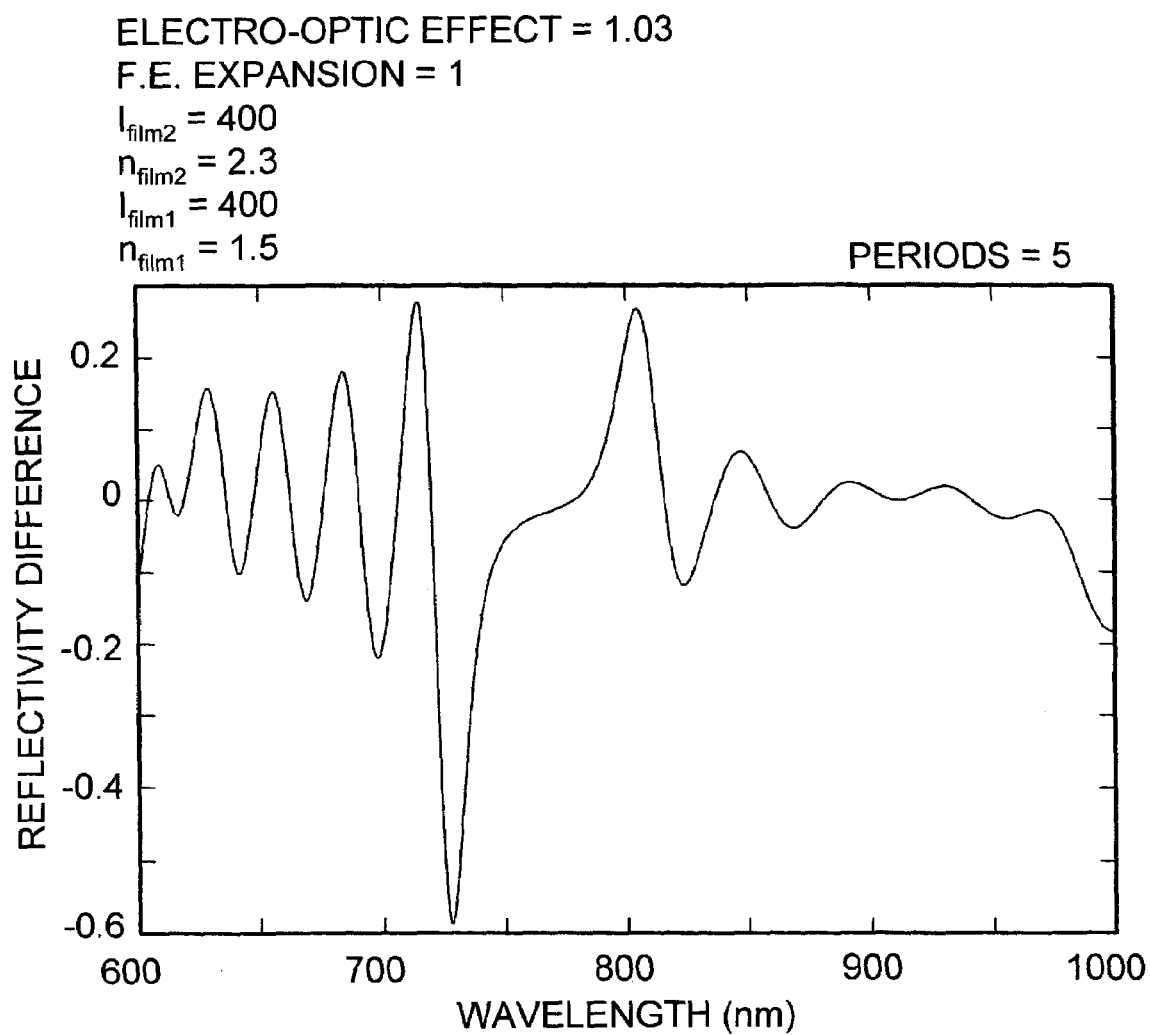
FIG. 7 shows a graph of a reflectivity difference from FIG. 6.

As is evident, a band of high reflectivity has developed in the multilayer structure and the reflectivity band is shifted as voltage is applied. FIG. 7 shows the difference in reflectivity between the two voltages. As the number of periods increase, the bands become better defined.

Figure 8:
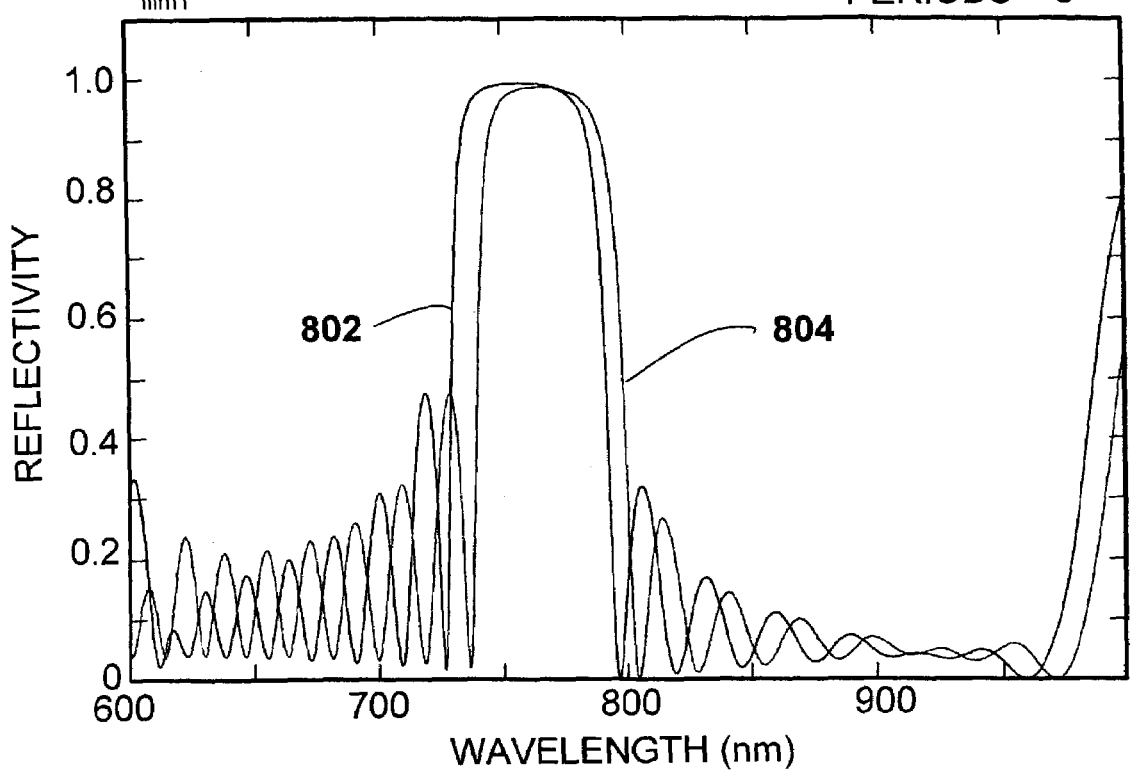
FIG. 8 shows a graph of the reflectivity for a structure with eight periods in accordance with an exemplary embodiment of the invention.
Figure 9:
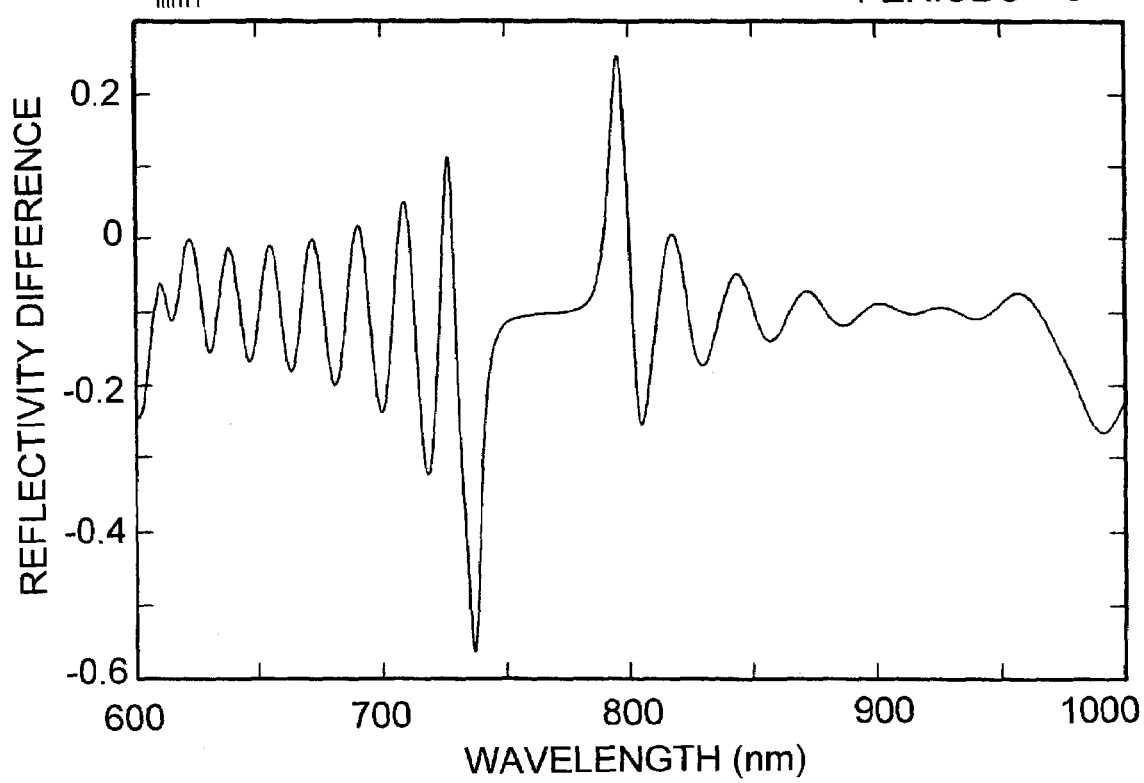
FIG. 9 shows a graph of a reflectivity difference from FIG. 8.

FIG. 8 shows the reflectivity for a structure with eight periods and FIG. 9 shows the reflectivity difference for the eight period structure. It is apparent from these graphs that, even though the electro-optic phase change for a single layer is small, the multiple interference in a multilayer structure allows for a large modulation of reflectivity.

Another structure that could be used in a dense, cheap, high speed array of vertical optical modulators is the etalon structure 350 shown in FIG. 3B. Here a high reflectivity electrode (352 and 354) is placed on both sides. The reflectivity of this structure 350 is easily calculated using the Airy equations (13)–(15) shown below.

$$\frac{I_r}{I_i} = \frac{4R \sin^2\left(\frac{\delta}{2}\right)}{(1-R)^2 + 4R \sin^2\left(\frac{\delta}{2}\right)} = \frac{F \sin^2\left(\frac{\delta}{2}\right)}{1 + F \sin^2\left(\frac{\delta}{2}\right)} \quad (15)$$

$$F = \frac{4R}{(1-R)^2} \quad (16)$$

$$\delta = \frac{4\pi n_1 z \cos\theta_1}{\lambda_0} \quad (17)$$

Figure 10:
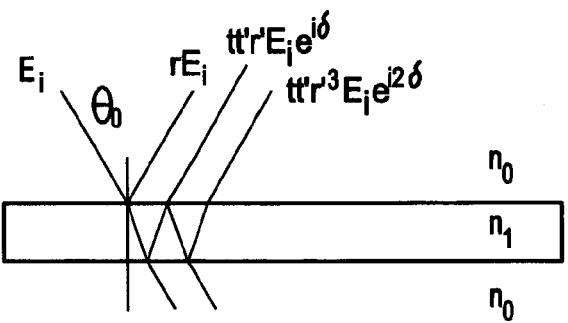
FIG. 10 shows the variables for calculating reflectivity.
Figure 11:
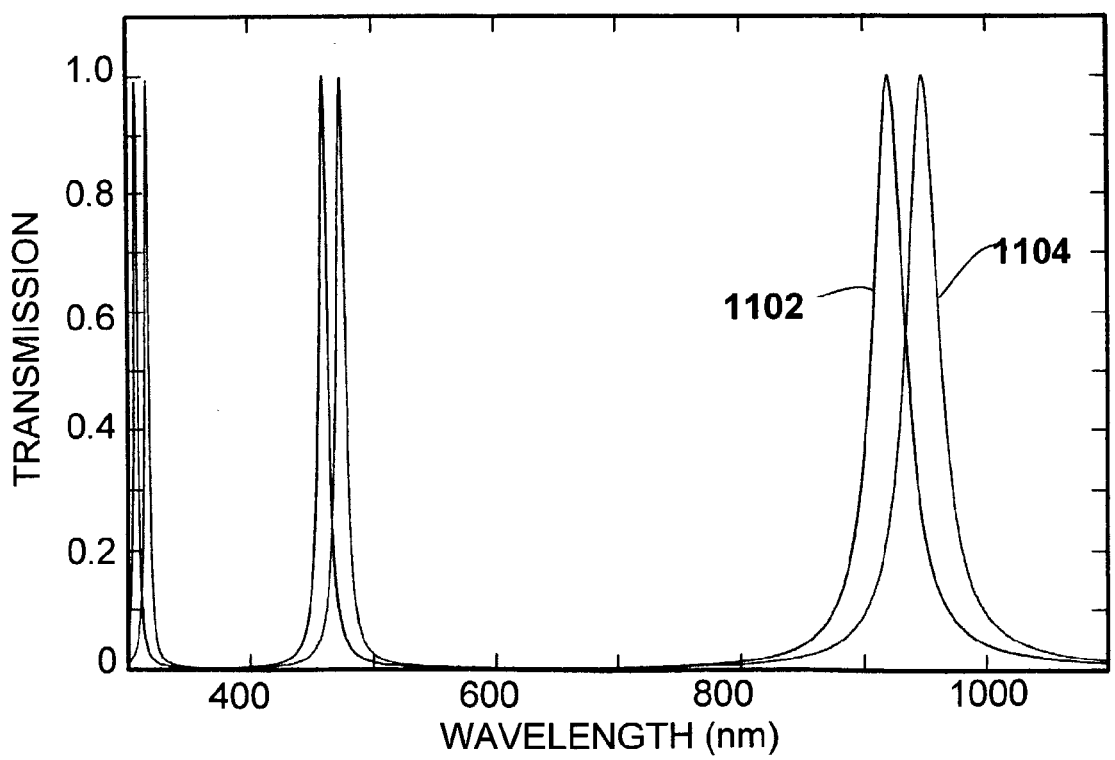
FIG. 11 shows a graph of the reflectivity as a function of wavelength for an etalon structure with 90 percent reflecting mirrors in accordance with an exemplary embodiment of the invention.
Figure 12:
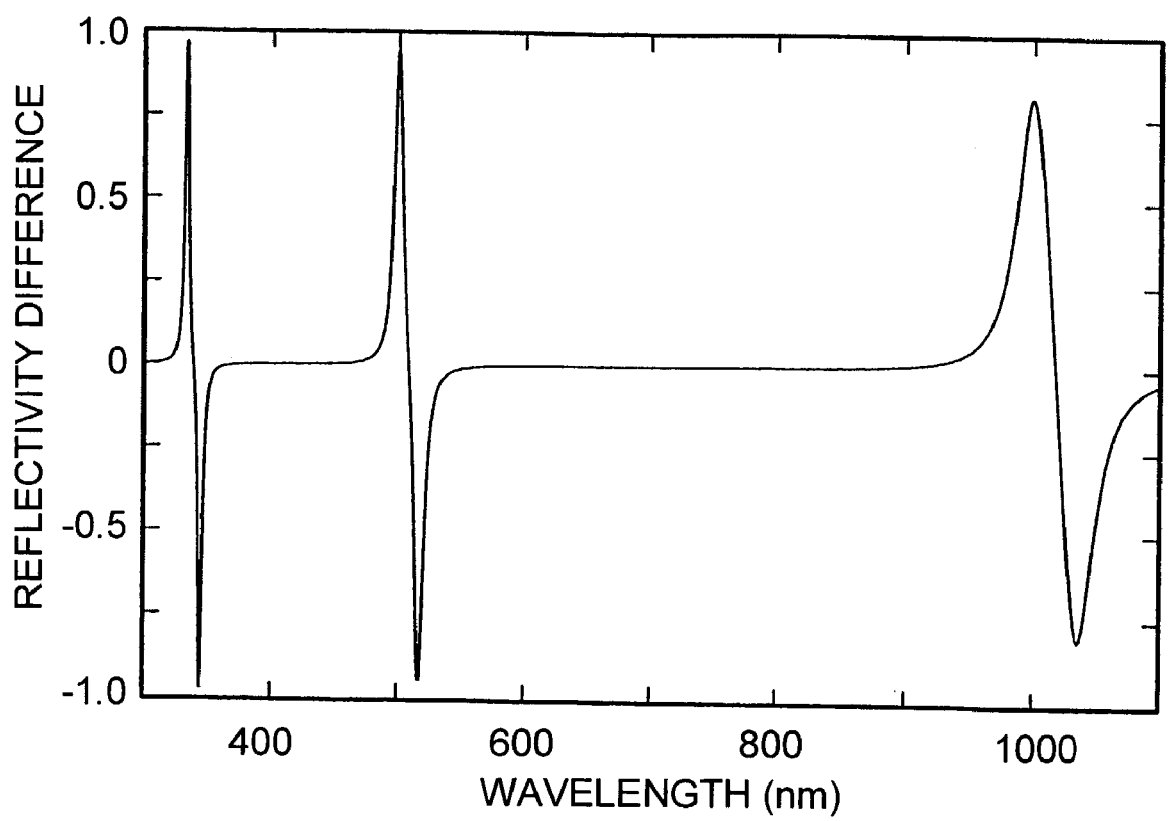
FIG. 12 shows a graph of the reflectivity difference from FIG. 11.
Figure 13A:
FIGS. 13A–13E show a method of fabricating a multilayer array in accordance with an exemplary embodiment of the invention.
Figure 13B:
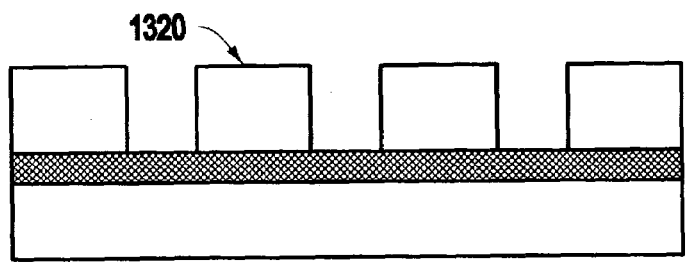
Figure 13C:
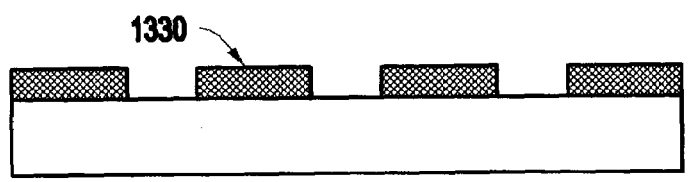
Figure 13D:
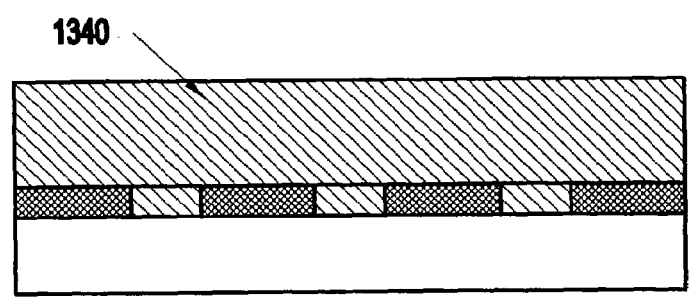
Figure 13E:
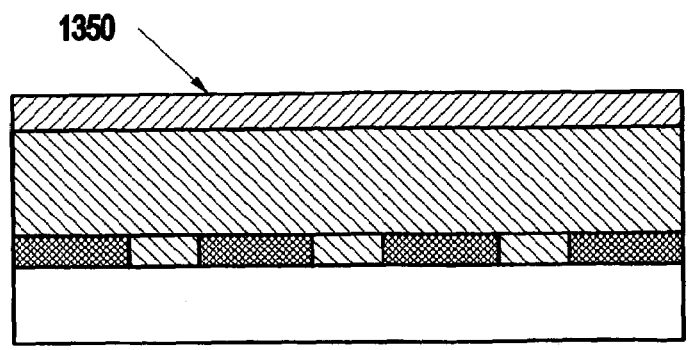

The variables for equations (13)–(15) are illustrated by FIG. 10. The reflectivity as a function of wavelength is shown for an etalon structure with 90 percent reflecting mirrors in FIG. 11. Again line 1102 is that expected for the zero voltage case while line 1104 is the reflectivity expected in the case that a voltage which induces a three percent index of refraction change is applied across the electro-optic film. FIG. 12 shows the reflectivity difference between these two curves. Once again, nearly 100 percent modulation can be attained to the interference associated with the highly reflecting top and bottom electrodes. The multiple peaks in FIG. 12 are (from right to left) the first, second and third order peaks of the etalon.

Using thin film longitudinal optical devices in a vertical arrangement means that lithographic techniques can be used to make 2-dimensional arrays of these devices. By making the devices small, they are not only dense (and, therefore, inexpensive) but also fast. The high speed of small devices comes about because the inherent speed of the vertical device is limited by the capacitance of the structure. The capacitance will diminish as the area of the device decreases.

Herein is disclosed a method for fabrication of an exemplary multilayer array that works as a one dimensional tunable optical modulator, which allows modulation of transmitted light.

An exemplary method of fabricating a multilayer array where each active unit of the array includes a layer of electro-optical material with its lower surface in contact with a bottom conducting layer, and its upper surface in contact with a top conductive layer is shown in FIGS. 13A–13E.

The process starts with a transparent substrate 1310, preferably a transparent oxide (Al2O3, SrTiO3, Quartz etc). Next, a bottom layer 1311 of transparent conducting oxide is deposited, the preferred material is ITO (doped indium tin oxide).

The next step includes patterning the conducting oxide layer 1311 by lithographic means. The ITO is ion milled through the lithographic mask 1320 so that the bottom electrodes 1330 are defined.

The next step includes the deposition of the electro-optical layer 1340 (PZT). The deposition methods of these oxides could be Pulsed Laser Deposition, Sputtering, or Chemical Solution Deposition (CSD). The next step includes the deposition of the top conducting layer 1350, followed by patterning as in 1311, to create the array of top electrodes.

Figure 14:
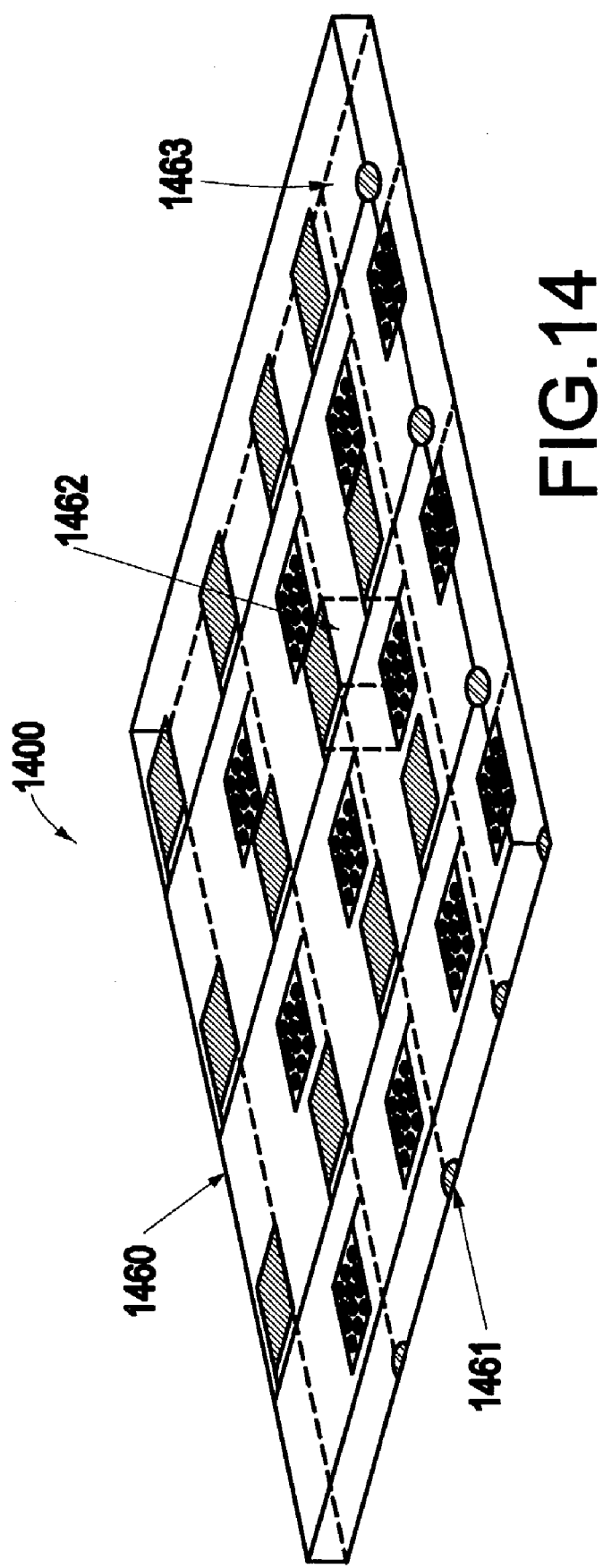
FIG. 14 shows a perspective view of an active multilayer array 1400 in accordance with an exemplary embodiment of the invention.

FIG. 14 shows a schematic representation of an active unit 1400, showing an electro-optical layer 1460, an array of bottom electrodes 1461 and an array of top electrodes 1463. Also shown in FIG. 14 is an electro-optical cell 1462, limited by the top and bottom electrodes 1461 and 1463. The array of electrodes is disposed so that a particular cell can be addressed by contacting the corresponding line of electrodes of the bottom array 1461, and the corresponding line of electrodes of the top array 1463, independently.

Figure 15:
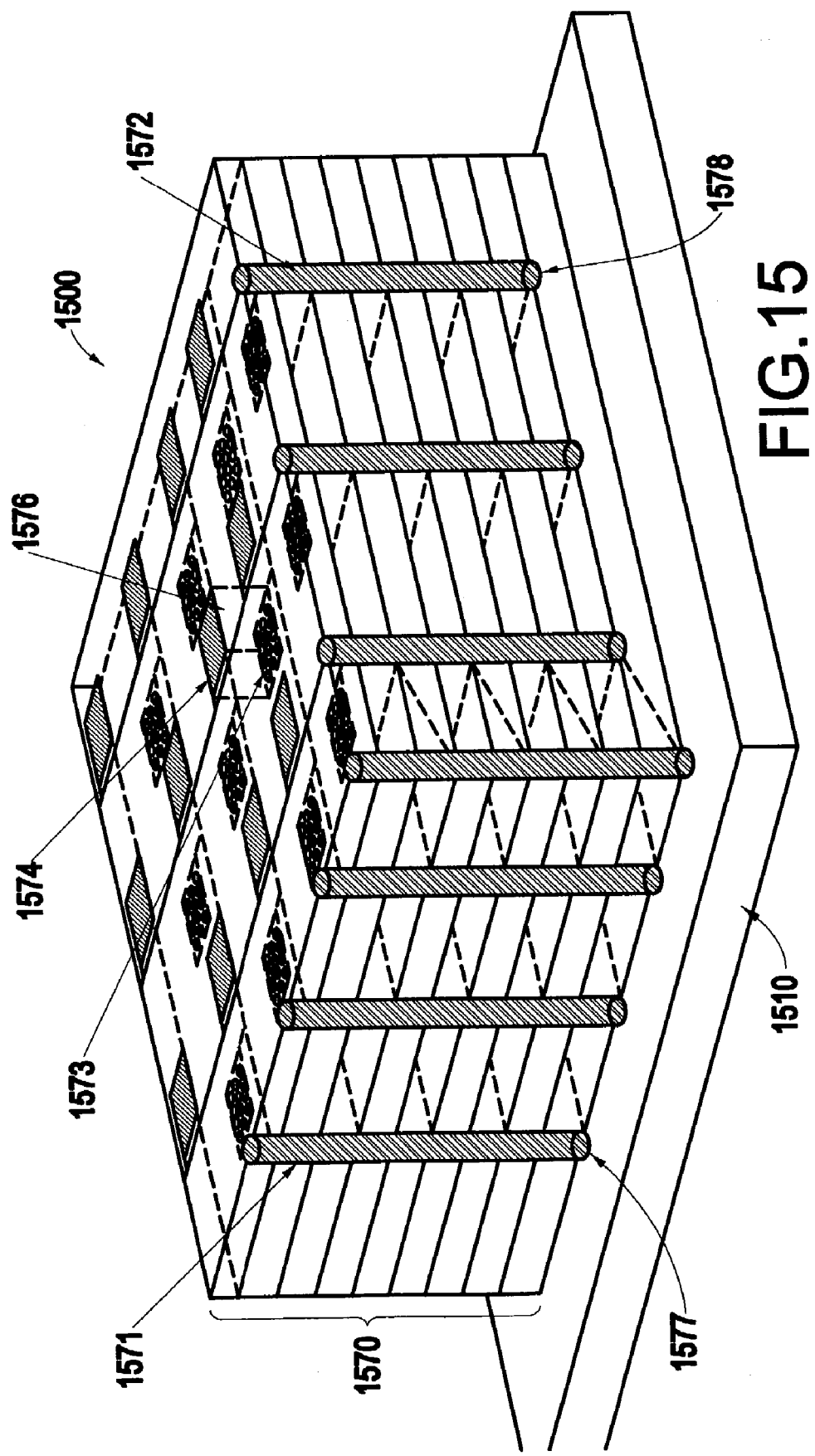
FIG. 15 shows a perspective of a multilayer array 1500 having nine active layers in accordance with an exemplary embodiment of the invention.
Figure 16:
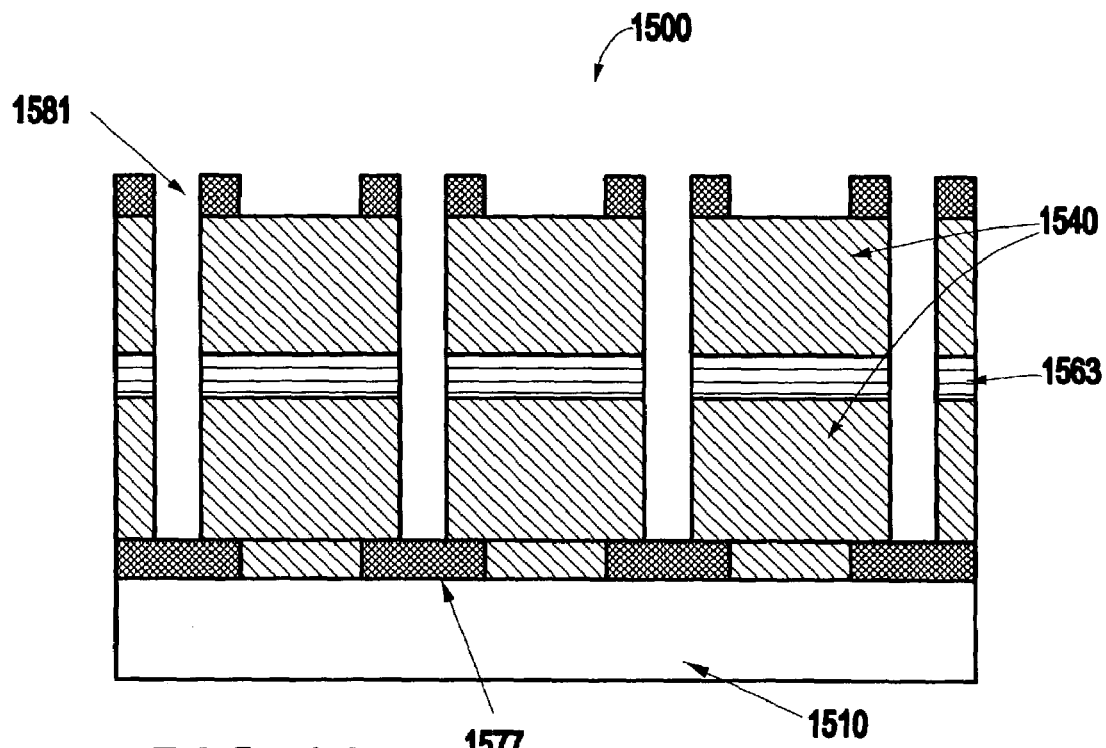
FIG. 16 is a cutaway view of an array in accordance with an exemplary embodiment of the invention.
Figure 17:
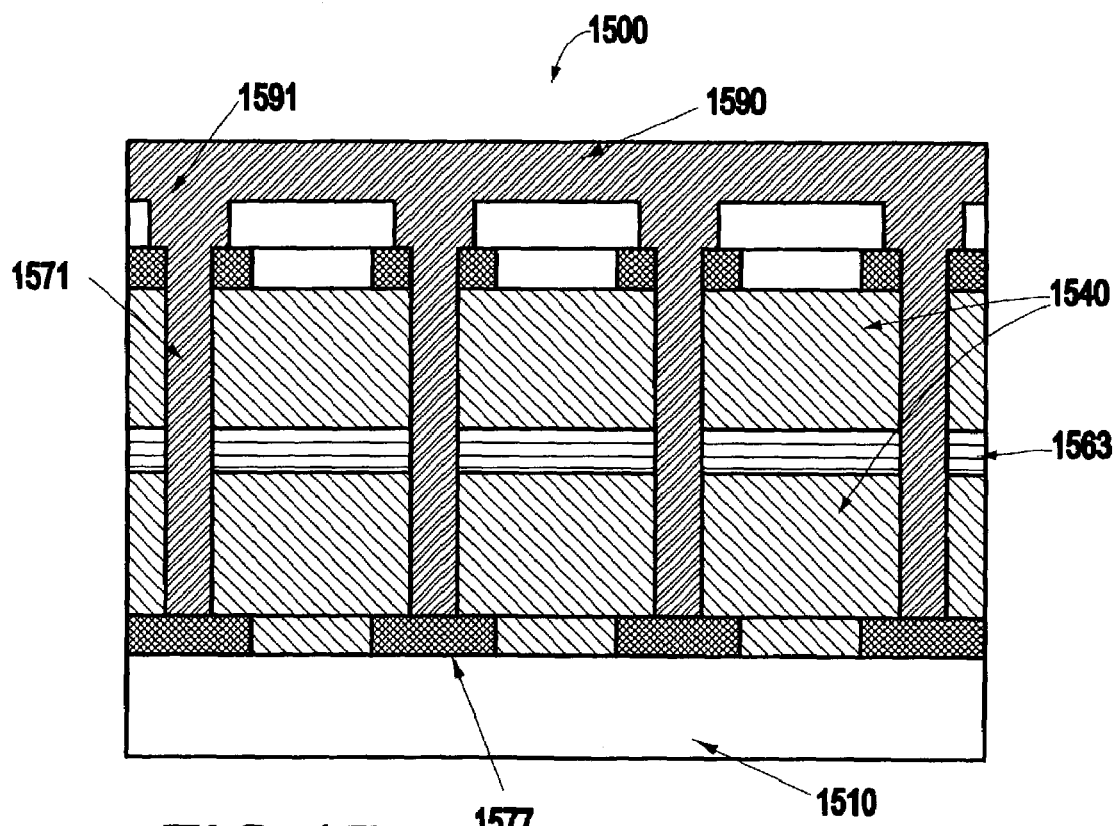
FIG. 17 is a cutaway view of the array of FIG. 16 with via holes filled with a metal.

FIG. 15 shows a stack 1500 of nine active layers, built by repeating the method described above. Thus, a bottom electrode 1573 of cell 1576 is the top electrode of the cell immediately underneath in the same column, and so on. Filled via holes 1571 connect lines of electrodes that are located above one another on the multilayer array, and which are polarized negative (positive). Filled via holes 1572 connect lines of electrodes that are located above one another on the multilayer array, and that are polarized positive (negative). One way to ensure that the vias are connected to the corresponding lines of electrodes is to connect the corresponding lines after the completion of two consecutive active units. This can be accomplished by using lithography to open the via holes 1581 through two electro optical layers 1540 and the conductive layer in between 1563 patterned with lines of electrodes perpendicular and of polarity opposite to lines of electrodes 1577, as shown in FIG. 16, and filling them with a metal 1590 using a different lithographic mask 1591 with larger features as shown in FIG. 17, followed by a lift-off, the next electro optical layer and planarization. The array can be tuned by changing the potential applied to the electrodes.

Yet another exemplary embodiment uses the array described above to build an etalon. In an etalon, the objective is to modulate the reflected light.

Figure 18:
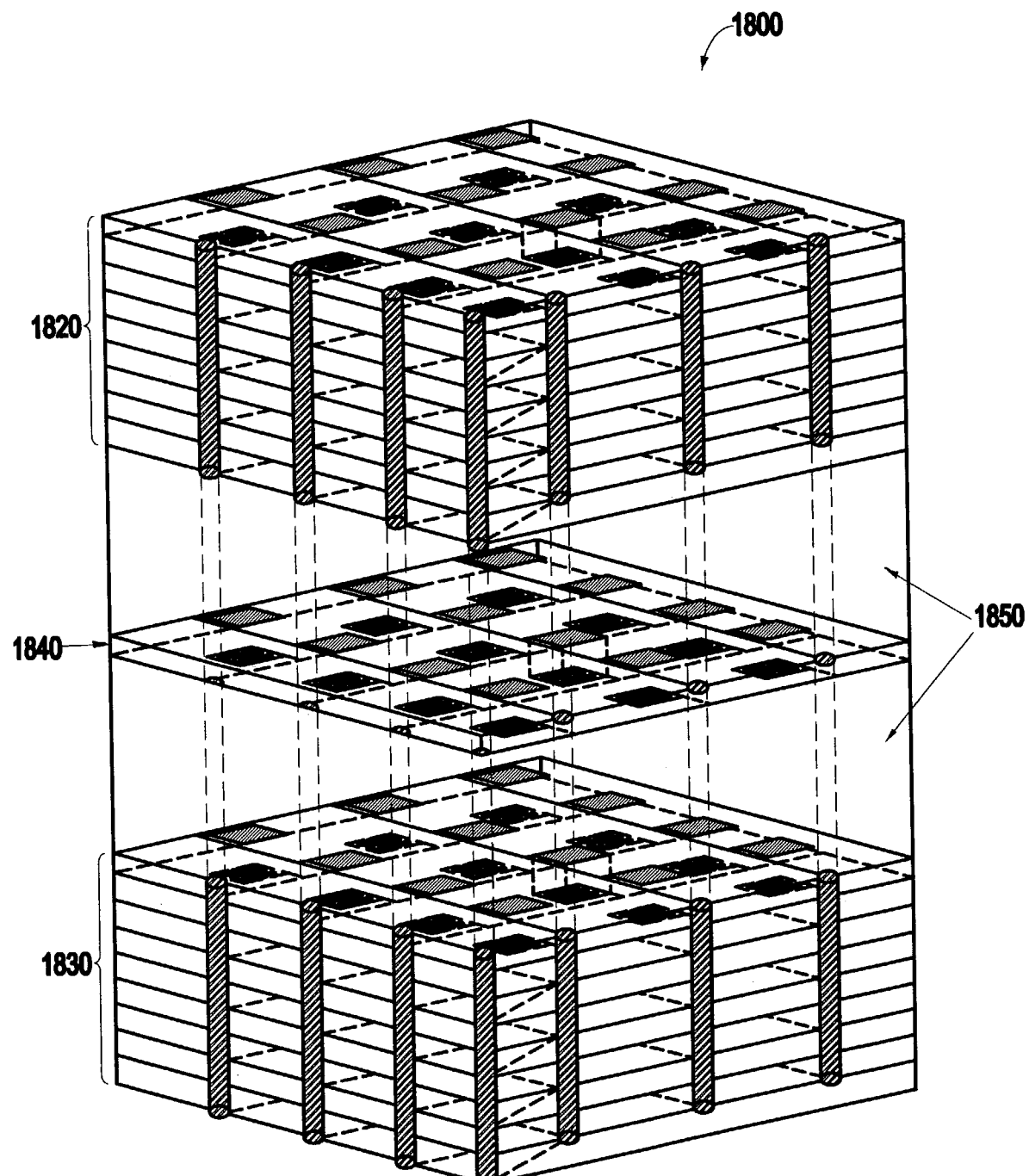
FIG. 18 shows a perspective view of an etalon 1800 using the array of FIG. 15 in accordance with an exemplary embodiment of the invention.

In an exemplary embodiment of the present invention shown in FIG. 18, a multilayer structure 1800 with n+1 active units as described above is built. Top and bottom active units 1820 and 1840 can be tuned to achieve a desired reflectivity coefficient. The active unit 1840 can be independently polarized so that its electro-optic characteristics change and, thus, change the reflectivity of the array. To achieve that effect, as shown in FIG. 18, new via holes are needed so that the top stack 1820 and the bottom stack 1830 are polarized independently of the unit in the middle 1840. Also, the stack 1840, should be separated from the adjacent top and bottom stacks by a transparent insulating layer 1850, for example, PZT.

The present invention provides a method and structure in which piezo-electric and electro-optic materials are used in conjunction with at least one transparent conducting electrode to make a thin film coating whose thickness and index of refraction can be changed for propagation of light normal to the thin film by application of an electric field.

With the use of transparent conducting electrodes, the electrodes can also be deposited by thin film techniques to make electro-optic elements in which the direction of propagation of the light is normal to the plane of the thin films and the light passes through the electrodes which apply the electric field. Such a device is a longitudinal modulator since the direction of propagation and the direction of the electric field are parallel. In this manner, more complicated integrated optical devices can be fabricated by stacking appropriate thin films of electro-optic materials, transparent conducting electrodes, and optical materials.

While the invention has been described in terms of several preferred embodiments, those skilled in the art will recognize that the invention can be practiced with modification.

Further, it is noted that, Applicant's intent is to encompass equivalents of all claim elements, even if amended later during prosecution.

What is claimed is:

1. An electro-optical device comprising:
   a first electrode layer;
   a first electro-optic material layer on the first electrode layer;
   a second electrode layer on the first electro-optic material layer;
   a second electro-optic material layer on the second electrode layer; and
   a third electrode layer on the second electro-optic material layer,
   wherein at least one of the first electro-optical material layer and the second electro-optic material layer is responsive to an electric field to change an optical characteristic,
   wherein at least one of the first electro-optic material layer and the second electro-optic material layer comprises a piezo-electric material, and
   wherein at least one of the first and third electrode layers comprises a high reflectivity electrode layer.

2. The device of claim 1, further comprising a transparent substrate under the first electrode layer.

3. The device of claim 2, wherein the transparent substrate comprises a transparent oxide.

4. The device of claim 1, wherein the other of the first electro-optic material layer and the second electro-optic material layer comprises a mirror.

5. The device of claim 1, wherein one of the first, second, and third electrode layers comprises a transparent conducting oxide.

6. A method for producing an electro-optical device, comprising:
   forming a first electrode layer on a transparent substrate;
   forming a first electro-optic material layer on the first electrode layer;
   forming a second electrode layer on the first electro-optic material layer;
   forming a second electro-optic material layer on the second electrode layer; and forming a third electrode layer on the second electro-optic material layer,
wherein at least one of said first electro-optical material layer and the second electro-optic material layer is responsive to an electric field to change an optical characteristic,
wherein at least one of the first electro-optic material layer and the second electro-optic material layer comprises a piezo-electric material, and
wherein at least one of the first and third electrode layers comprises a high reflectivity electrode layer.

7. The method of claim 6, further comprising forming one of said first, second, and third electrode layers by one of pulsed laser deposition sputtering and chemical solution deposition.

8. The method of claim 6, further comprising forming at least one of the first electro-optical material layer and the second electro-optical material layer by one of pulsed laser deposition sputtering and chemical solution deposition.

9. The method of claim 6, further comprising patterning at least one of the first, second, and third electrode layers.

10. The method of claim 6, further comprising milling one of said first, second, and third electrode layers.

11. The method of claim 6, further comprising repeating the forming steps to provide the other of said first electro-optic material layer and said second electro-optic material layer.

12. The method of claim 11, further comprising providing interconnections to equivalent rows of conducting elements formed on each of said first electrode layer, second electrode layer, and third electrode layer.

13. The method of claim 12, wherein said interconnections enable each of said first electrode layer, second electrode layer, and third electrode layer to be independently addressed.

14. An electro-optical device comprising:
a transparent oxide substrate;
a first patterned and milled high-reflectivity electrode layer on said transparent oxide substrate;
a first Lead Lanthanum Zirconate layer on the first high-reflectivity electrode layer and being responsive to an electric field to change an optical characteristic;
a second patterned and milled electrode layer on the first Lead Lanthanum Zirconate layer;
a second Lead Lanthanum Zirconate layer on the second electrode layer and being responsive to an electric field to change an optical characteristic;
a third patterned and milled high-reflectivity electrode layer on the second Lead Lanthanum Zirconate layer;
interconnections for independently addressing each of said first high-reflectivity electrode layer, said second electrode layer and said third high-reflectivity electrode layer; and
a power supply having a first pole connected to said first high-reflectivity electrode layer and said third high-reflectivity electrode layer through corresponding interconnections and a second pole connected to said second electrode layer through a corresponding interconnection,
wherein each of said first high-reflectivity electrode layer, said second electrode layer, and said third high-reflectivity electrode layer has an index of refraction of about 1.5 and a thickness of about 400 nm, and
wherein each of said first Lead Lanthanum Zirconate layer and said second Lead Lanthanum Zirconate layer has an index of refraction of about 2.3 and a thickness of about 400 nm.

* * * * *